G. CLAESON.
ANIMAL TRAP.
APPLICATION FILED JUNE 24, 1914.
1,131,908.
Patented Mar. 16, 1915.
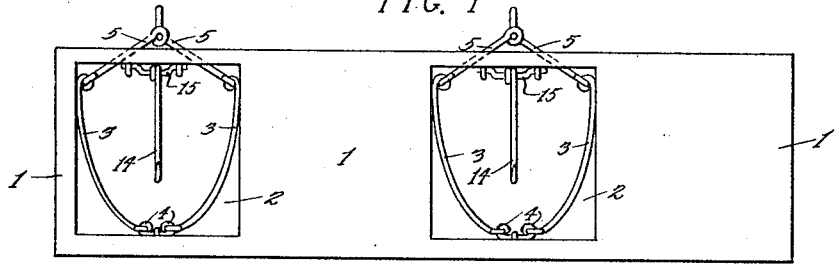
Fig. 1
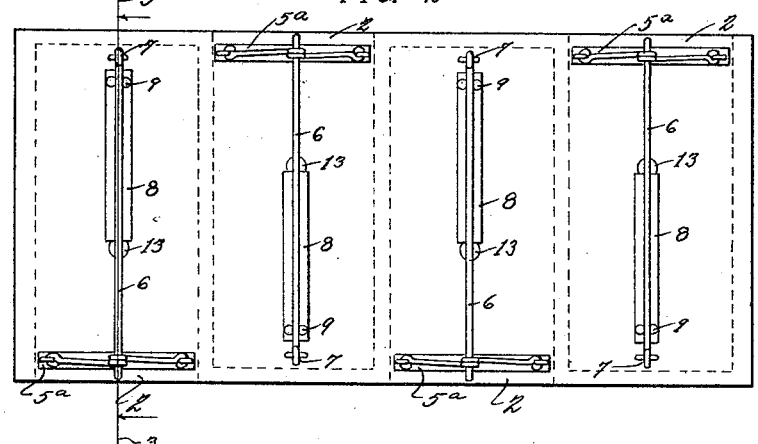
Fig. 2
Fig. 3
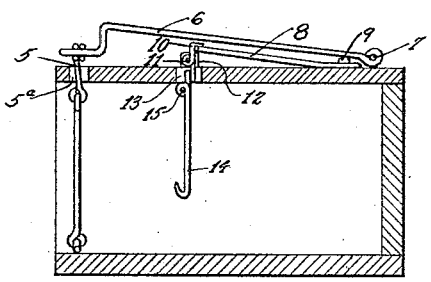
WITNESSES
Otto Melchior
A.S.S. Nickelsen
INVENTOR
G. Claeson
H. Darden
BY        ATTY

UNITED STATES PATENT OFFICE.

GUNNAR CLAESON, OF SUPERIOR, WISCONSIN.

ANIMAL-TRAP.

1,131,908. Specification of Letters Patent. Patented Mar. 16, 1915.

Application filed June 24, 1914. Serial No. 846,978.

*To all whom it may concern:*

Be it known that I, GUNNAR CLAESON, residing at Superior, in the county of Douglas and State of Wisconsin, have invented certain new and useful Improvements in Animal-Traps, of which the following is a specification.

This invention relates to improvements in animal traps and its object is to produce a trap wherein the animal is killed in a humane manner and without undue suffering.

With the foregoing and other objects in view the invention consists in the combination and arrangement of parts to be hereinafter fully described in the following specification, pointed out in the claims and illustrated in the accompanying drawing in which—

Figure 1 is a front elevation of my improved trap. Fig. 2 is a plan of the same. Fig. 3 is a section taken on line 3—3 of Fig. 2.

Like reference characters indicate corresponding parts throughout the several views.

My improved trap comprises the cage or housing 1 provided with a plurality of openings 2 in each lateral face. Curved wires 3, 3 are disposed in each opening 2 and have their lower extremities engaged by a keeper 4 secured to the floor of the cage in the center of said opening; said wires 3, 3 normally resting against the cage within the opening as best shown in Fig. 1 of the drawing and to the hooked upper extremity of each wire 3 links 5, 5 are secured which extend through an opening 5ᵃ in the roof or top of the cage and are carried by an angular rod 6 which is terminally pivoted as at 7 to the roof of said cage.

A flexible trigger 8 is secured to the roof of the cage directly beneath the rod 6 as at 9 and the free end of said trigger is normally engaged by a catch 10 pivoted at 11 in lugs 12 carried by the cage and said catch projects into an opening 13 in said roof for engagement with the end of the bait hook 14 which is pivoted upon a pin 15 carried by the roof of the cage. The bait is fixed to the lower end of the bait hook within the cage. The animal enters the opening 2 in the cage and nibbles at the bait which oscillates the bait hook and causes the same to move the catch 10 out of engagement with the trigger, releasing the same and permitting it to move into engagement with the rod 6 and press the same upwardly or in a direction away from the cage with great force. This movement will cause the links 5, 5 to draw the wires 3, 3 together engaging the head or body of the animal and squeezing him until death ensues.

What is claimed is:—

1. In an animal trap, a cage having openings in its lateral faces, curved wires disposed against the sides of said openings, keepers connecting the lower extremities of said wires, links connecting the upper ends of said wires and projecting through the roof of said cage, an angular rod pivoted to the roof of said cage, carrying said links, a trigger terminally secured to the roof of said cage beneath said rod and bait-carrying means releasably engaging said trigger and depending into the interior of said cage.

2. In an animal trap, a cage provided with openings in its lateral faces, curved wires arranged within said openings, keepers disposed within said openings connecting the adjacent ends of said wires, a trigger, flexible means connecting said trigger and the said wires whereby the latter members may be moved toward each other with great force and bait-carrying means within said cage for normally retaining said trigger in set position.

In testimony that I claim the foregoing as my own I have hereto affixed my signature in the presence of two subscribing witnesses.

GUNNAR CLAESON.

Witnesses:
 JOHN FREGARD,
 CHAS. LEGARD.

Copies of this patent may be obtained for five cents each, by addressing the "Commissioner of Patents, Washington, D. C."